(12) United States Patent  
Montgomery et al.

(10) Patent No.: US 9,921,357 B2
(45) Date of Patent: Mar. 20, 2018

(54) THIN BACKLIGHT WITH RECYCLING TO REDUCE THE BEZEL WIDTH

(71) Applicant: Sharp Kabushiki Kaisha, Osaka (JP)

(72) Inventors: David James Montgomery, Oxford (GB); Takeshi Ishida, Osaka (JP); Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/188,144

(22) Filed: Jun. 21, 2016

(65) Prior Publication Data

US 2017/0363793 A1  Dec. 21, 2017

(51) Int. Cl.
 *F21V 5/02* (2006.01)
 *F21V 8/00* (2006.01)
(52) U.S. Cl.
 CPC ......... *G02B 6/0025* (2013.01); *G02B 6/0088* (2013.01)
(58) Field of Classification Search
 USPC .............................. 362/339, 623, 608; 349/15
 See application file for complete search history.

(56) References Cited

U.S. PATENT DOCUMENTS

| 6,079,840 | A * | 6/2000 | Ono ..................... G02B 6/0055 |
| | | | 362/23.18 |
| 6,935,764 | B2 | 8/2005 | Choi et al. |
| 6,951,401 | B2 | 10/2005 | Van Hees et al. |
| 7,838,375 | B1 | 11/2010 | Xu et al. |
| 8,451,398 | B2 | 5/2013 | Mizuuchi et al. |
| 8,755,007 | B2 | 6/2014 | Momose |
| 8,911,133 | B2 | 12/2014 | Sato et al. |
| 9,513,508 | B2 * | 12/2016 | Lee ..................... G02F 1/133615 |
| 2005/0180165 | A1 | 8/2005 | Sato et al. |
| 2006/0255346 | A1 | 11/2006 | Kunimochi |
| 2009/0015753 | A1 | 1/2009 | Ye |
| 2011/0090423 | A1 | 4/2011 | Wheatley et al. |
| 2013/0222737 | A1 | 8/2013 | Mizutani |
| 2013/0258708 | A1 * | 10/2013 | Huang ................. G02B 6/0023 |
| | | | 362/608 |

(Continued)

FOREIGN PATENT DOCUMENTS

CN  202210196  5/2012
EP  1862730  12/2007

(Continued)

*Primary Examiner* — Allyson Trail
(74) *Attorney, Agent, or Firm* — Renner, Otto, Boisselle & Sklar, LLP

(57) ABSTRACT

A backlight unit includes a lightguide, a light source that emits light to the lightguide, and a barrier layer positioned over the lightguide in a light emitting direction relative to the lightguide. The barrier layer defines a bezel area of the backlight unit, and an active area of the backlight unit from which light is emitted from the lightguide is an area adjacent to a boundary of the bezel area. A prism structure is positioned in the bezel area, wherein stray light emitted from the light source uncoupled to the lightguide is at least partially coupled into the lightguide by the prism structure or directed to a greater degree along the lightguide. The prism structure may be configured as a plurality of lenticular triangular prisms, and may be mounted to a mounting frame, back reflector, or flat panel connector of the backlight unit.

20 Claims, 15 Drawing Sheets

(56) References Cited

U.S. PATENT DOCUMENTS

| | | | | |
|---|---|---|---|---|
| 2014/0043859 A1* | 2/2014 | Yang | .................... | G02B 6/0011 |
| | | | | 362/623 |
| 2014/0158982 A1* | 6/2014 | Park, II | ................. | G02B 6/005 |
| | | | | 257/13 |
| 2015/0029442 A1* | 1/2015 | Koike | ................. | G02B 6/0053 |
| | | | | 349/65 |
| 2015/0369973 A1* | 12/2015 | Liu | ........................ | G02B 5/045 |
| | | | | 359/831 |
| 2016/0291239 A1* | 10/2016 | Lee | ..................... | G02B 6/0053 |

FOREIGN PATENT DOCUMENTS

| | | |
|---|---|---|
| JP | 2006244825 | 9/2006 |
| JP | 2010040246 | 2/2010 |
| JP | 2010056030 | 3/2010 |
| JP | 2010056089 | 3/2010 |
| JP | 4552095 | 9/2010 |
| WO | WO 2012133160 | 10/2012 |

* cited by examiner

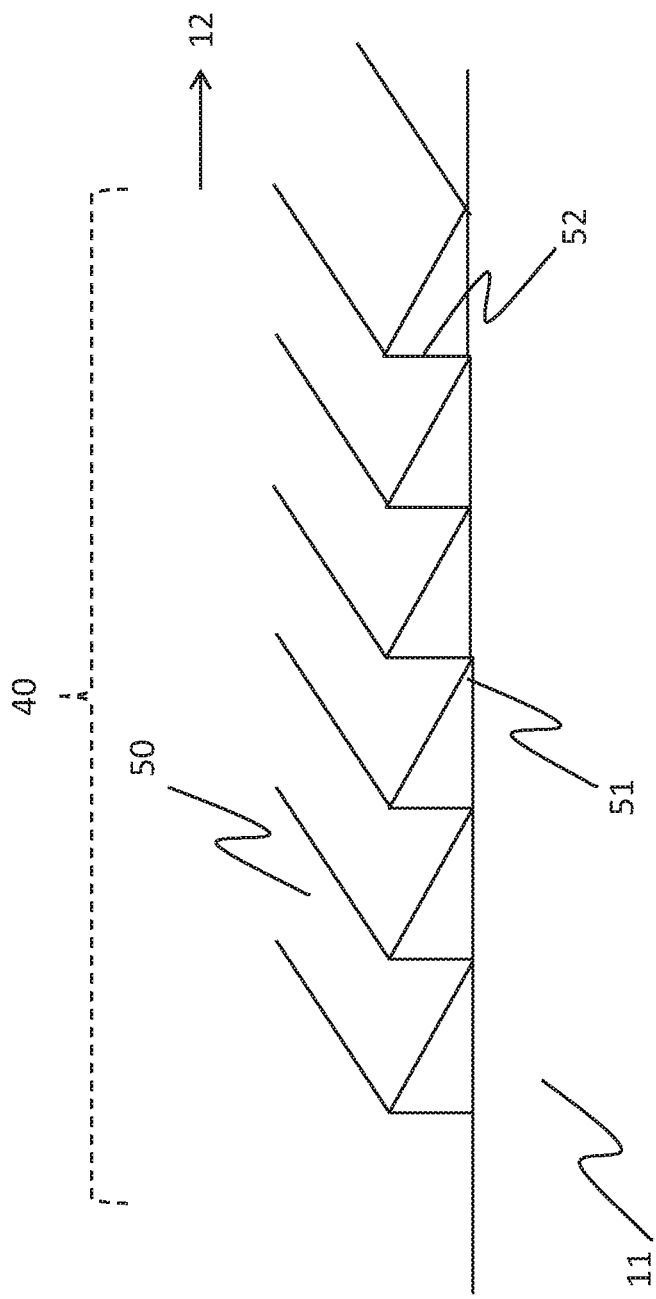

THIN BACKLIGHT WITH RECYCLING TO REDUCE THE BEZEL WIDTH

TECHNICAL FIELD

This invention concerns mobile style backlights that use lightguides in order reduce thickness and also other backlights that are required to use lightguide plates. In this case the side light sources must be hidden, meaning a minimum bezel width of 2 millimeters or more. This invention will seek to reduce this significantly without any increase in thickness to the backlight.

BACKGROUND ART

The bezel on a backlight refers to the unilluminated area around the edge of the backlight that is typically covered using black tape. There are many methods for reducing the bezel width in the prior art. Direct view backlights, where light emitting diodes (LEDs) are distributed behind the liquid crystal display (LCD) and shine directly through, have a very low bezel width in principle, but in general are too thick and expensive for a small area application. Such small area applications (of display sizes approximately 15 inches in diagonal or less) typically use lightguides with patterned extraction features and edge emitting LEDs to illuminate the LCD. This enables less LEDs to be required and very thin form factors. However, the area around the LED must be obscured as the high brightness and non-uniformity of this area would mean a display could not be positioned over this area. This area incorporates flat panel connector (FPC) electronics, the LED itself and the mixing area of the lightguide, where it is not possible to achieve uniformity by extraction feature control alone. This obscuration would be the limiting bezel width, meaning that a black area of at least 2-3 mm exists at the LED end of the lightguide.

Reducing this bezel area to create more usable display area for the device size has been a source of study. A cross section of the types of conventional configurations are summarized below:

JP 4552095 (Chiaki et al., issued Sep. 29, 2010) and U.S. Pat. No. 7,838,375 (Xu et al., issued Nov. 23, 2010) both position the LEDs at the corner of the lightguide where the natural spread of the LED light better fills the lightguide area.

JP2010056030 (Shin, published Mar. 11, 2010) angles the LEDs in such a way as to efficiently spread light into the lightguide.

U.S. Pat. No. 8,451,398 (Mizuuchi et al., issued May 28, 2013), U.S. Pat. No. 8,755,007 (Momose, issued Jun. 17, 2004) and JP2010056089 (Tong et al., published Mar. 11, 2010) describe reflecting structures on the far side of the lightguide that efficiently reflect light back in order to make better the uniformity near the LEDs.

U.S. Pat. No. 8,911,133 (Sato et al., issued Dec. 16, 2014) utilizes an air-guide with LEDs illuminating an airgap between highly reflecting areas, and an array of apertures are used to achieve uniformity. This system is relatively thick and proposed mainly for lighting applications.

US 20090015753 (Ye, published Jan. 15, 2009), U.S. Pat. No. 8,427,603 (Ishikawa et al., issued Apr. 23, 2013) and U.S. Pat. No. 6,935,764 (Choi et al., issued Aug. 30, 2005) describe structures on the area near the LEDs molded into the lightguide in order to better spread the light to reduce the mixing area.

US20050180165 (Sato et al., published Aug. 18, 2005) describes a secondary lightguide member that makes the LED illumination more uniform into the main lightguide.

A number of patents such as US20110090423 (Wheatley et al., published Apr. 21, 2011) and JP2010040246 (Osamu, published Feb. 18, 2010) attempt to thin the structure by adding lightguide elements to an LED array as used in a direct view backlight. This is to reduce the thickness of a direct view system in order to achieve a thinner unit.

Attempts to hide the LEDs on an edge based system include U.S. Pat. No. 6,951,401 (Van Hees et al., issued Oct. 4, 2005) and US20060255346 (Kunimochi, published Nov. 16, 2006) where the LEDs and lightguide are wrapped around beneath the main lightguide, and secondary lightguides are used underneath the main lightguide.

Patents such as CN202210196 (Li, published May 2, 2012), WO2012133160 (Kazunori, published Oct. 4, 2012) and JP2006244825 (Hiroshi, published Sep. 14, 2006) use patterned filters above the LEDs or a structured diffuser to reduce the non-uniformity.

EP1862730 (Singo et al., published Dec. 5, 2007) describes an alternate system whereby the LED is structured to fit into a specially made structure at the front end of the lightguide in order to maximize the spread of the light from the LED.

Patent US20130222737 (Mizutani, published Aug. 29, 2013) describes gradient index (GRIN) materials in structures in the lightguide near the LED in order to spread light more efficiently.

All of the above patents or patent publications either increase the thickness of the backlight or improve the spreading of the light between the LEDs so that sufficient light reaches the closest area of the active area mid-way between the LEDs to achieve efficient uniformity. This then defines the closest bezel position. However, none of these patents or patent publications deal with stray light, i.e., light that fails to couple from the LED to the lightguide for some reason, such as misalignment or a gap between the LED and the lightguide. This invention is intended to provide a solution to this problem.

SUMMARY OF INVENTION

The bezel area for a typical backlight based on lightguides has at least one part where the bezel area needs to hide the light sources that couple light into the lightguide. This area limits the minimum thickness of this bezel area to the width of the light sources plus any area for the frame and electronics. In this width is also a section of the lightguide, called the mixing area, where the light density is too concentrated near the LEDs and not between them such that a high efficiency uniform output is not possible. For most backlights of this type, the mixing area is chosen so that the level of uniformity meets efficiency targets. In order to improve this trade off, it is necessary to increase the spread of light away from the LEDs. With a plane interface into a refractive material, the angle of spread will be limited by the refraction. In order to improve the angle of spread, there are many methods in the prior art to do this.

However, when the mixing distance becomes very small, especially in the case of smaller mobile and wearable devices, another factor becomes important, specifically stray light that is not coupled to the lightguide or is scattered out of the lightguide. This stray light is generally only a small fraction of the total light (<1%). For typical bezel systems, this stray light is absorbed by the black tape covering the bezel or FPC, but if the mixing distance is small a substantial fraction of the stray light reaches the active area and is extracted near the LEDs, leading to local non-uniformity. This light extraction can be similar in magnitude to light normally extracted, meaning that the extraction cannot be easily corrected for by altering the extraction in the lightguide.

This stray light can be dealt with by adding more black absorbing tape at the lightguide, but this absorbs a fraction of the existing light in the lightguide leading to a substantial loss in efficiency, typically 5-10%.

This invention is intended to offer an alternative manner whereby the efficiency is maintained while reducing the stray light contribution to non-uniformity.

The main embodiment of this invention is described in reference to a typical thin existing backlight. This backlight typically may include a lightguide with light source such as an LED coupled into the lightguide. The lightguide may have a reflector behind it and FPC connections, diffusers and prism sheets above the lightguide. The backlight is also mounted in a frame and the bezel width is the sum of the frame width, FPC distance, light source width and mixing distance.

This embodiment may add a further prism structure positioned on the frame of the backlight underneath the mixing distance of the lightguide, but not part of the light guide. The prisms may be lenticular and of constant triangular cross section and are layered parallel with the input face of the lightguide. The prism cross section may have one angle substantially near 90 degrees and positioned away from the light sources, the sloping side pointing towards the light sources. The features can be of the same thickness as the reflector sheet meaning there is no overall increase in thickness of the backlight. The features can be specular reflecting or diffusive.

This invention works by controlling the stray light by reflecting it back towards the light sources. This would mean that the stray light may be either recycled in the light source (or scattering wall between the light sources) so that a fraction will be coupled back into the lightguide, or more efficiently absorbed by the materials present. In either case the stray light extracted through the active area is substantially reduced (typically by 80-90%). Also, as the prisms are not on the lightguide, no light is extracted from the lightguide, meaning no loss in overall efficiency. Indeed, when some of the stray light is recycled, the efficiency can be improved.

This invention is advantageous over conventional configurations in that in that the prism structures are not part of the lightguide and do not reduce efficiency in the overall backlight. As these prism structures deal with stray light and not spreading, the prism structures can be used with existing spreading technology to get a very small mixing area distance.

This invention has further embodiments described in reference to the first embodiment.

The prism structures do not need to be made on the lower frame but can be made on the FPC layer over the lightguide instead. This means the invention can be used with backlights without a lower frame.

The prisms can be used with existing spreading technology to further reduce the mixing distance (and hence bezel distance).

The prisms may differ in size and angle as a function of position, and the prism lines may be shaped around the light source locations.

The diffuser also may be a phosphor diffuser and the light source may be single colour (e.g. blue or ultraviolet). The phosphor may be a nanophosphor or quantum dot phosphor.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 5: A detail of the prism features in the first embodiment

DESCRIPTION OF REFERENCE NUMERALS

Figure 1:
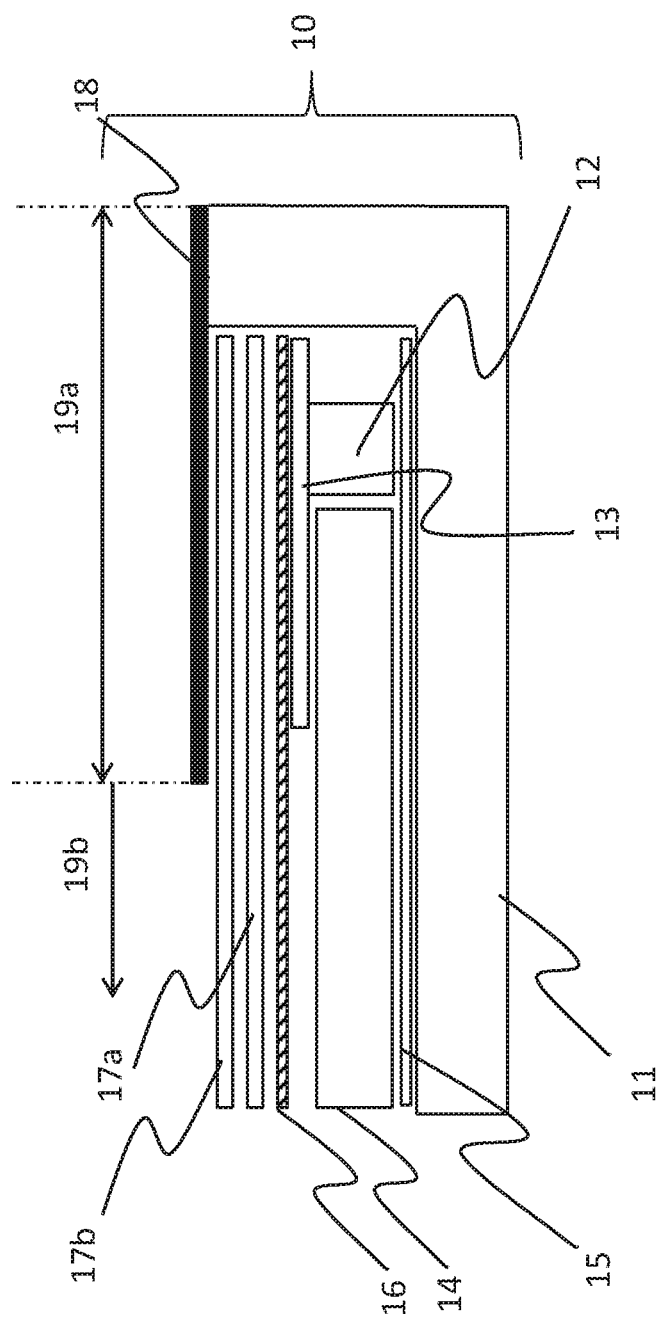
FIG. 1: An exemplary backlight arrangement

10: Exemplary backlight for a first embodiment and overview of the invention

11: The mounting frame for the backlight

12: The light source (e.g. LED)

13: The Flat Panel Connector (FPC) for the light source

14: The lightguide

15: The lower reflector

16: A diffuser

17a, 17b: Crossed prism sheets (e.g. BEFs)

18: Barrier layer/Top black tape defining the active area

19a: The bezel area width

19b: The active area

20: Light emitted with spread required for light to achieve uniformity

21: Midpoint between the light sources close to them.

30: Light path for stray light (light not coupled to the lightguide)

31: The stray light leaving the active area, causing non-uniformity

40: The lenticular prism structures near the light source on the frame beneath the lightguide

50: Prism element of the lenticular structures

51: The angle of the main slope of the prisms

52: The short side of the prism element

60: The path of stray light with the prisms

70: Known in-coupling features on the lightguide
80: Trapezoid structure element of the in-coupling features.
120: Phosphor layer diffuser
130: Reverse prism structures in a further embodiment
140: The light path in the reverse prism embodiment
141: The stray light exiting through the active area from the reverse prism embodiment.

DETAILED DESCRIPTION OF INVENTION

As referenced above, the bezel area on a backlight refers to the unilluminated area around the edge of the backlight that is typically covered using black tape. When used with a spatial light modulator (SLM) (such as a liquid crystal panel) to create a display, this area is not aligned with the display active area and forms a surrounding back area to the display.

As displays become smaller and SLM panels have smaller and smaller edges, there is a need to create a smaller bezel edge on the backlight to properly illuminate the display panel. Typically, such backlights may include a lightguide and edge light sources and the widest section would be the edge with the light sources.

FIG. 1 shows a typical cross section of this part of such a backlight 10. This part may include a mounting frame 11, though the part underneath the backlight is not necessary in some backlight configurations. The backlight 10 also may include one or more light sources 12 mounted on a flat panel connector (FPC), 13, that connects the sources to the power supply. The sources can be LEDs or other light sources such as lasers, and may be configured as an edge light source that emits light to the short side of the lightguide.

The backlight 10 also may include a lightguide 14 and a lower reflector 15. In addition, a diffuser layer 16 that diffuses light from the lightguide and crossed prism sheets 17a and 17b are typical. These sheets are not necessary for this invention and may include alternative sheets, such as for example polarization reflection sheets (e.g. DBEFs) which are not necessary and not shown.

Figure 2:
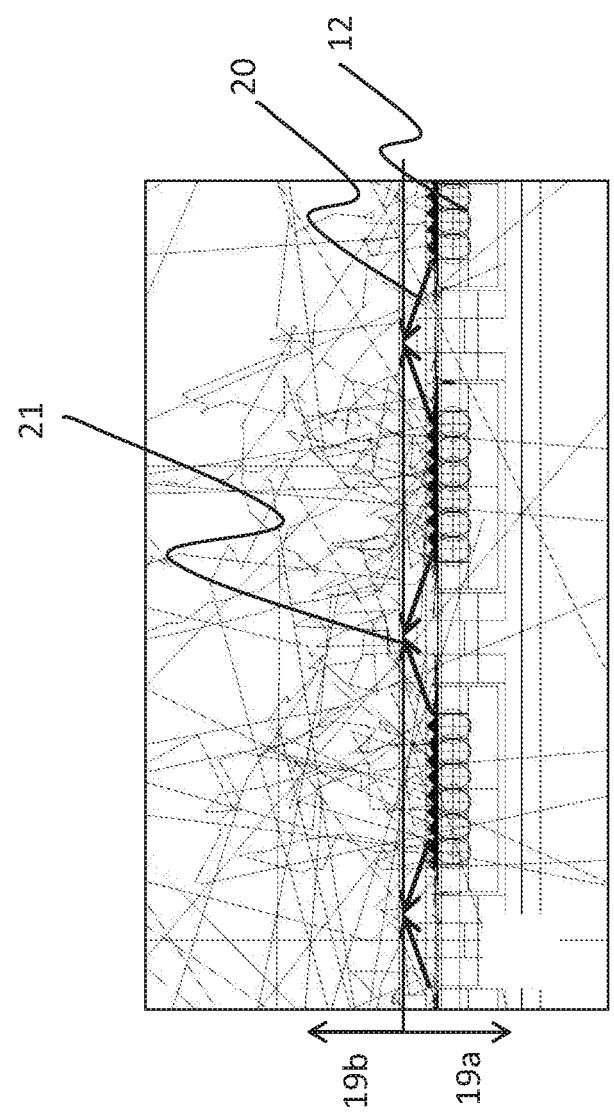
FIG. 2: The spread required for a uniform backlight

A barrier layer 18, such as a layer of black or otherwise opaque tape 18, is positioned on top and defines the bezel area width 19a and the boundary of the active area 19b. Generally, the barrier layer or tape 18 may be positioned over the light source and part of the lightguide in a light emitting direction relative to the lightguide, the barrier layer defining the bezel area 19a of the backlight unit, and the active area 19b of the backlight unit from which light is emitted from the lightguide is an area adjacent to a boundary of the bezel area. In order to determine where exactly the boundary of the active area is, there should be sufficient density of light at all places in the lightguide in the active area so that a portion can be extracted from the light sources on the active area boundary closest to these sources, as shown in FIG. 2 depicting a spread required for a uniform backlight. Light emitted 20 from the sources 12 needs to spread to a midpoint 21 between the light sources. Generally, this is limited by refraction in the coupling of light into the lightguide, but various methods are known in order to increase this spread angle in order to reduce the bezel width.

Figure 3:
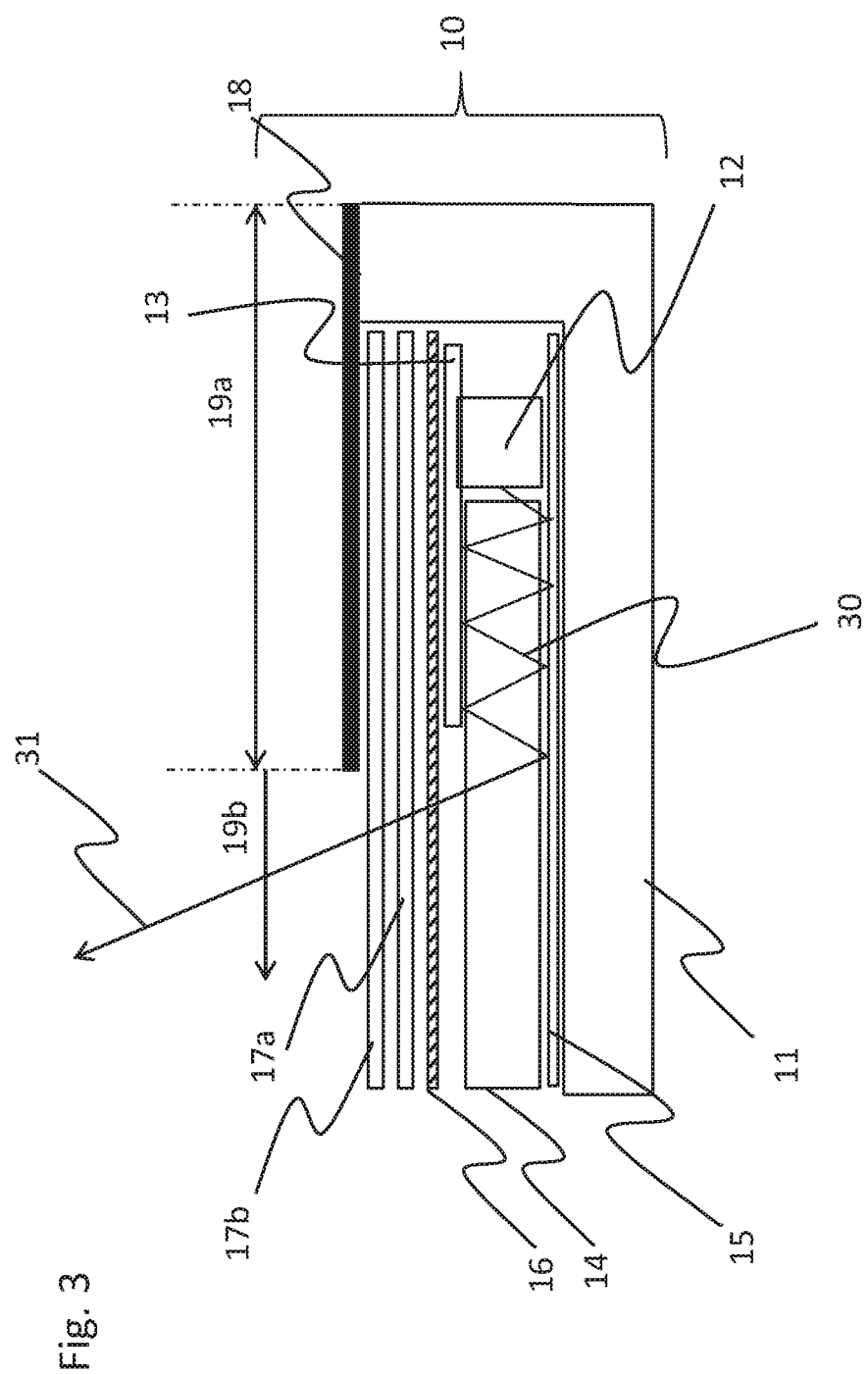
FIG. 3: The path of stray light not coupled to the lightguide

However, when the bezel width becomes quite small, another effect becomes important, and this is shown in FIG. 3. Stray light along light path 30 not coupled to the lightguide, either from misalignment or scatter, will bounce between the FPC and lower reflector. The amount of this stray light is low (typically <1%) relative to the total light. Where the bezel is large, this light is gradually absorbed and does not contribute to the active area light. When the bezel is smaller this stray light becomes increasingly important, and stray light 31 will emerge from the active area in a small area near the light sources. As this stray light is difficult to control, the stray light cannot easily be incorporated into the controlled uniformity of the active area and thus creates bright spots in this area.

This stray light can be reduced by improving the absorption in the bezel area with absorbing materials, but it is very difficult to prevent absorption in the lightguide, where a significantly higher light density exists. Thus, removal of this 1% of light leads to a 5 to 10% drop in efficiency of the whole backlight using absorbing material.

To overcome such deficiencies with the control of stray light, the claimed invention pertains to a backlight unit that includes a prism structure for at least partially coupling the stray light into the lightguide. In exemplary embodiments, the backlight unit may include a lightguide, a light source that emits light to the lightguide, and a barrier layer positioned over the light source and a part of the lightguide in a light emitting direction relative to the lightguide, the barrier layer defining a bezel area of the backlight unit, and an active area of the backlight unit from which light is emitted from the lightguide is an area adjacent to a boundary of the bezel area. The backlight unit further may include a prism structure positioned in the bezel area, separate from the lightguide, wherein stray light emitted from the light source uncoupled to the lightguide is at least partially coupled into the lightguide or directed along a direction of the lightguide by the prism structure.

Figure 4A:
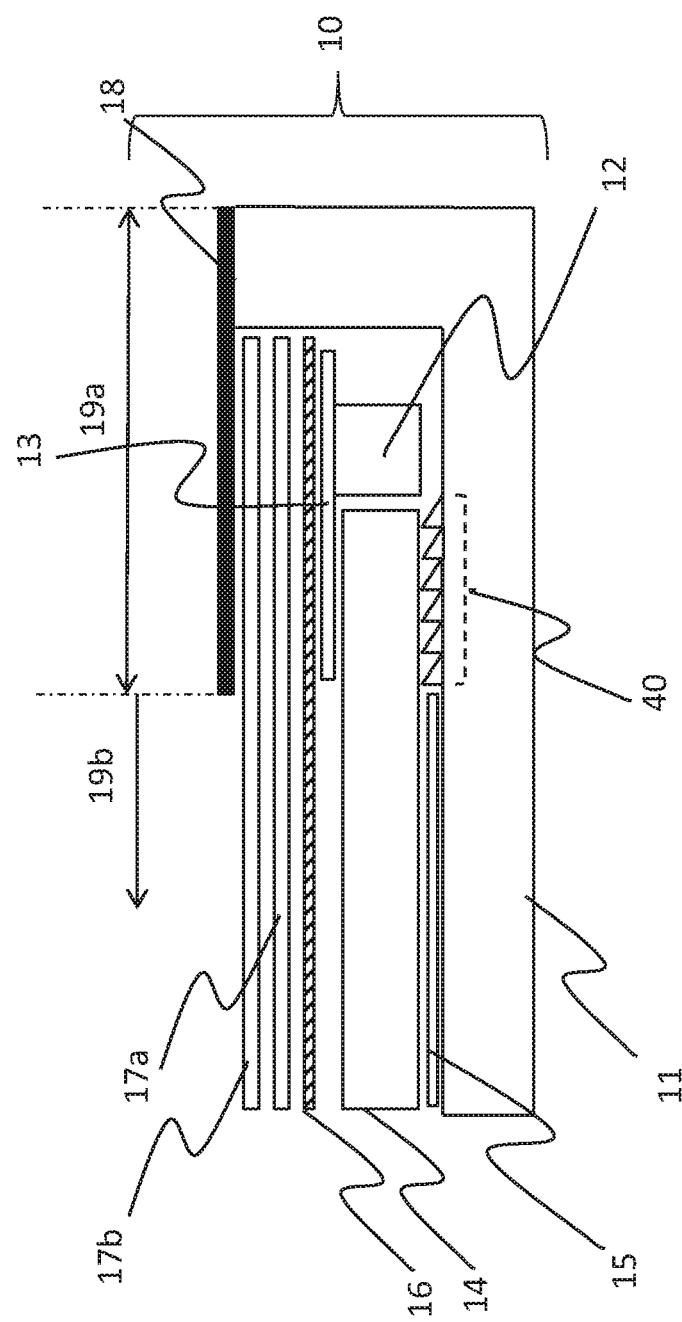
FIG. 4A and FIG. 4B: Drawings showing a first embodiment of the invention

The first embodiment of this invention is described in the coming paragraphs and is shown in FIG. 4a. This invention is described in reference to the typical backlight and the alterations are described in each embodiment. In the first embodiment, a prism structure is configured as a plurality or set of lenticular triangular prisms 40. In the example of FIG. 4a, the triangular prisms have a constant cross section and are positioned on the frame underneath the lightguide and in the bezel area of the backlight. The direction of the lenticular prism is parallel to the in-coupling face of the lightguide. In particular, the lower reflector 15 can be repositioned so that the prism features are no higher than the reflector so there is no increase in thickness.

Accordingly, in the embodiment of FIG. 4a, the prism structure generally may be located on a side of the light guide opposite from a light emitting side of the lightguide. In particular, the backlight may include the mounting frame 11 for mounting components of the backlight unit, and the prism structure may be mounted to the mounting frame. The back reflector 15 may be positioned in the active area on a side of the light guide opposite from the light emitting side of the backlight, and a height of the prism structure relative to the mounting frame may be no higher than the reflector.

The prism features can be specular or scattering and can be made of the same material as the frame beneath the lightguide. The features could be made into the mold used to make the frame to involve no increase in fabrication costs.

The prisms can also be molded into the reflector sheet.

Figure 4B:
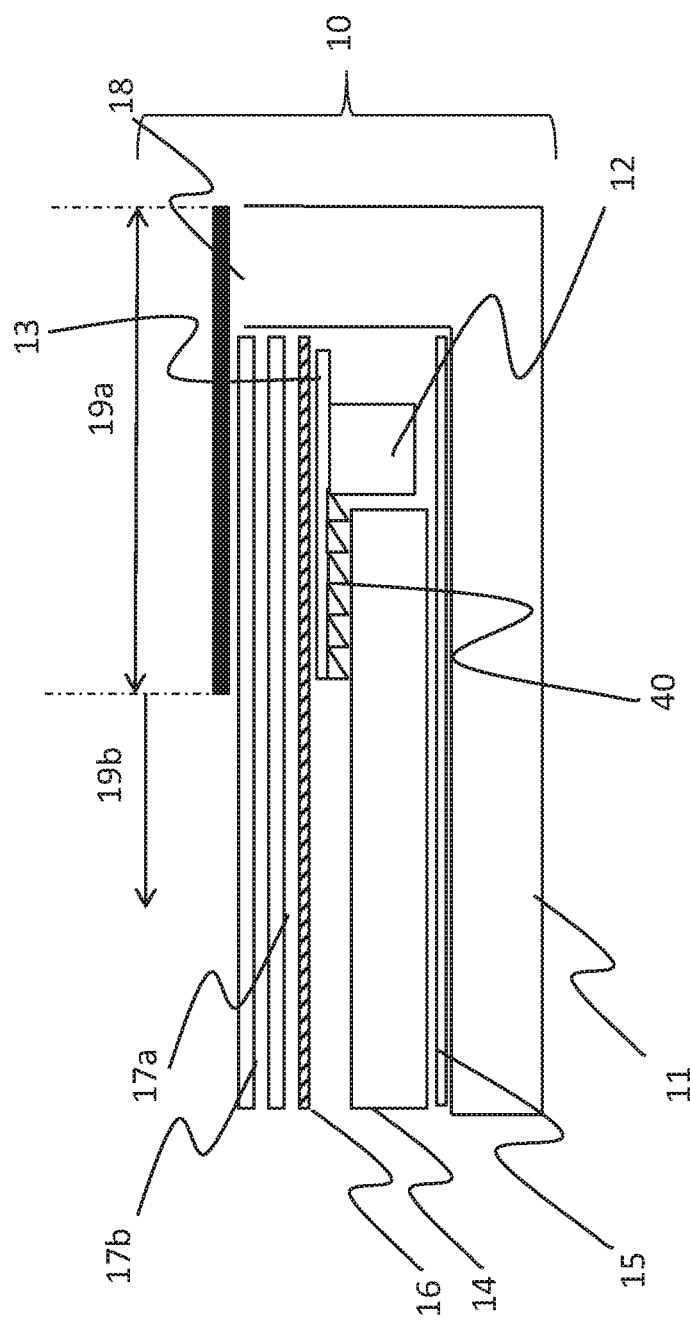

Prisms 40 can also be placed on the FPC or other mounting above the lightguide, and this is shown in the embodiment of FIG. 4b. This embodiment has an advantage if there does not exist a lower part to the frame 11 in this design. Accordingly, in the embodiment of FIG. 4b, the prism structure generally may be located on a light emitting side of the lightguide. The backlight unit may include the flat panel connector 13 on which the light source 12 is mounted, and the prism structure may be mounted on the flat panel connector adjacent to the light source. (FIG. 4b).

A detail of the prism shapes of the triangular prisms 40 is shown in FIG. 5. The set of the triangular prisms is made up of individual lenticular prisms 50 which have a substantially triangular shape. The angle furthest from the light source 12 can be substantially 90°, and the angle 51 of the main slope of the prisms is optimized for best performance in preventing stray light from exiting the active area. In exemplary embodiments, the main sloping sides then face towards the light source. The height of the prisms at the short side 52 of the prism elements can also be optimized so that there is no increase in thickness of the display.

Figure 6:
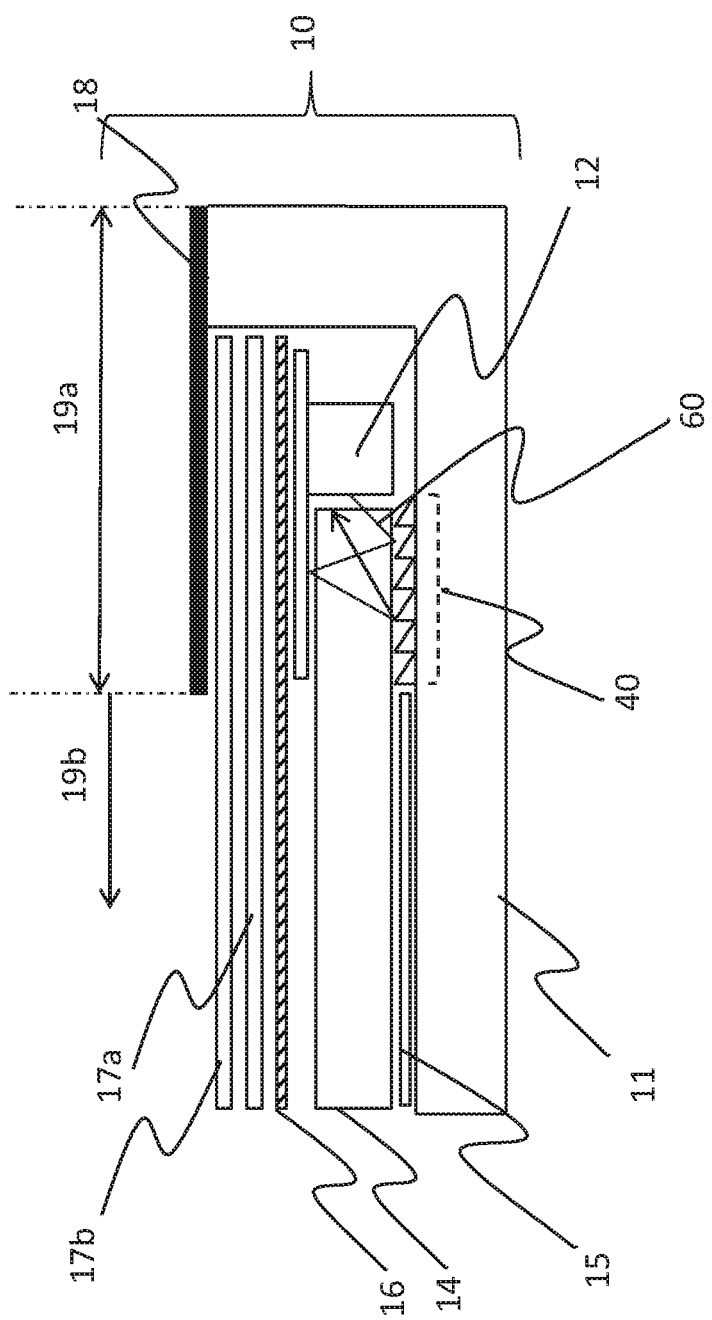
FIG. 6: The path of stray light in the first embodiment

The operation of these prism elements is shown in FIG. 6, and such operation is referenced in contrast to the configuration of FIG. 3 without the prism elements. The stray light emitted 30 in FIG. 3 generally is at a high angle to the direction of the lightguide (otherwise it would be coupled to the lightguide) and bounces a number of times before exiting. The stray light emitted along light path 60 in FIG. 6 starts this bounce but is reflected by the sloping faces of the prisms 40. The stray light then turns around and is sent back to the light source (or any scattering surface between the light sources). In this case the stray light is absorbed and scattered, and most of the scattered light will couple properly into the lightguide. The amount of light then exiting the active area and causing non-uniformity is substantially reduced. The limitation in the bezel width is then based again more on the spread.

These features need not be placed only at the light source end, but at any side of the backlight where scatter from the back frame will create stray light not back-coupled into the lightguide, and thus non uniformity in the active area at that point. The presence of the light sources is not necessary, for only the prism features are under the bezel black tape.

Figure 7:
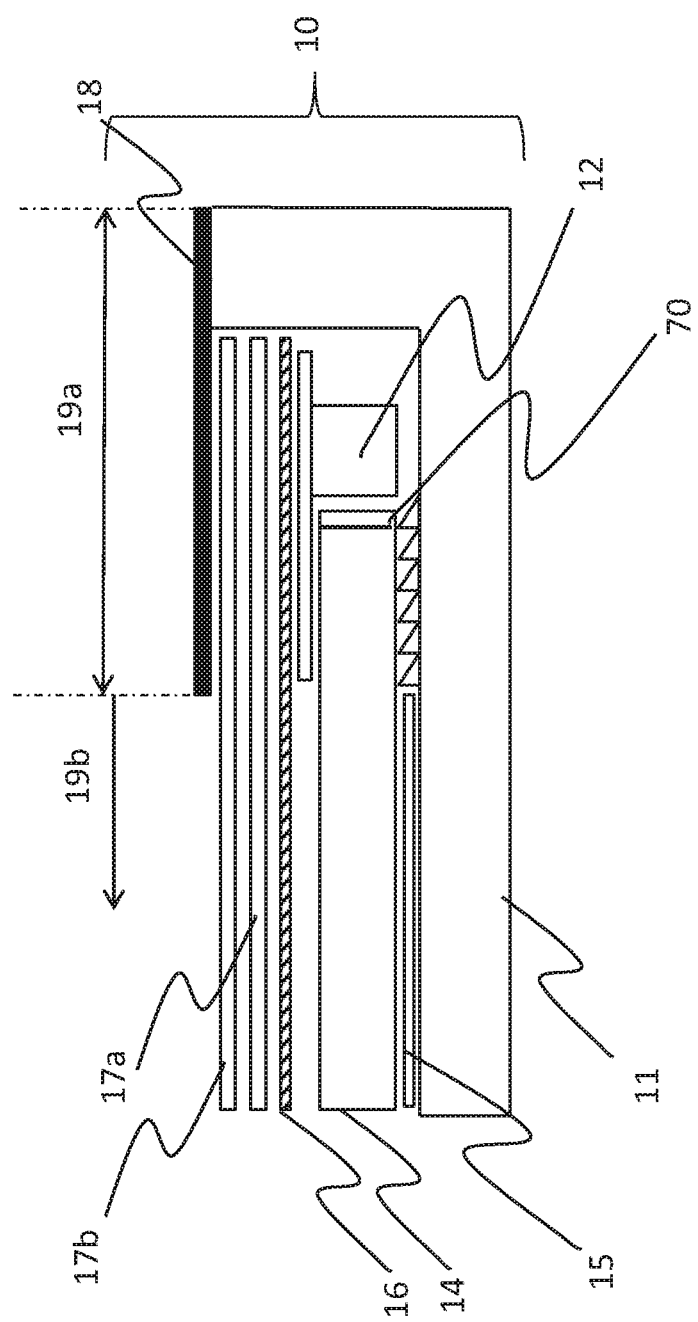
FIG. 7: The use of in-coupling features in the first embodiment
Figure 8:
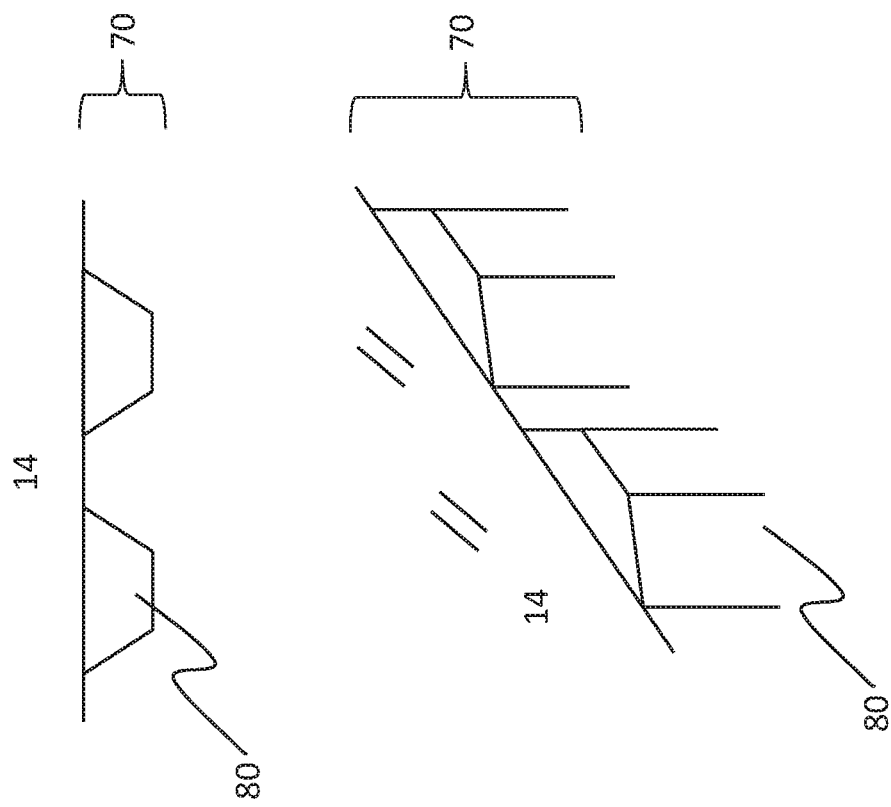
FIG. 8A and FIG. 8B: A detail of the in-coupling features

FIG. 7 shows one such example of a known method of spreading the light involving linear in-coupling features 70 vertically orientated on the entrance face of the lightguide so that the light entering the light guide from the light source is spread more by the in-coupling features, and thus the backlight unit has a lower bezel width at the light sources. A detail of these in-coupling features is shown in FIGS. 8a and 8b, where trapezoidal cross section prisms 80 are placed vertically on the entrance face of the lightguide.

Figure 9:
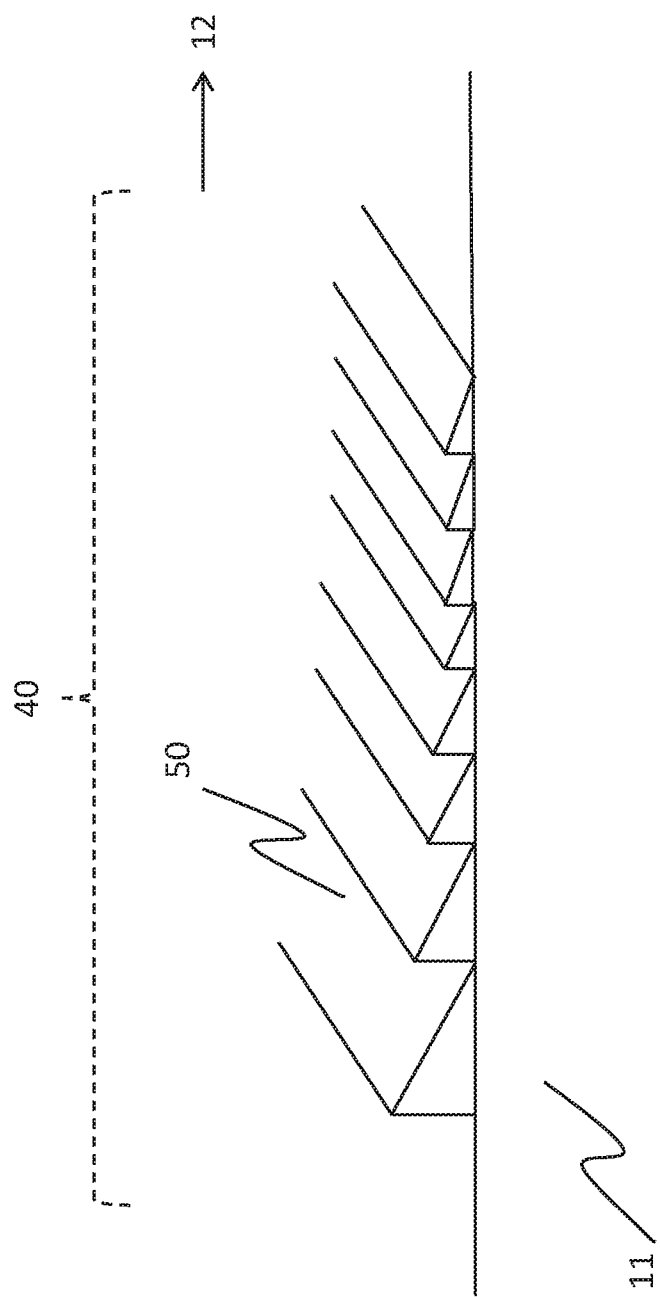
FIG. 9: Prism structures with variable size

It is not necessary that the prism elements 50 have a constant size. In the exemplary embodiment of FIG. 9, the prisms are shown with a pitch that varies with position along the prism structure.

Figure 10:
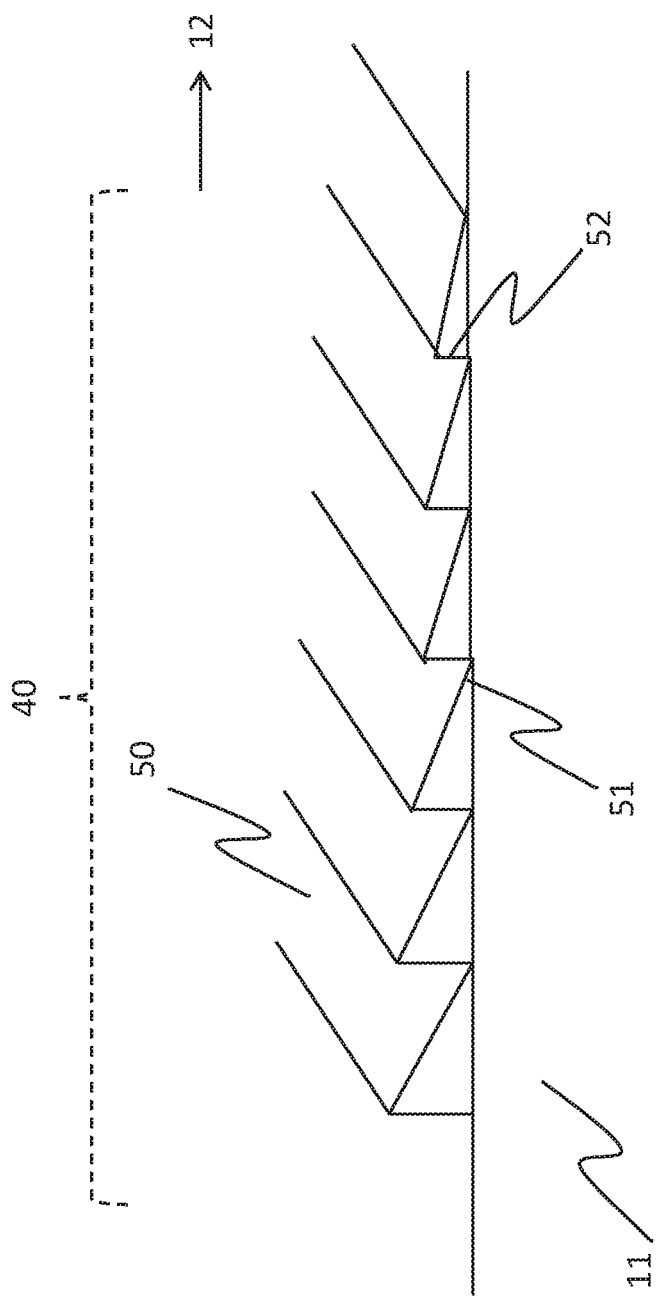
FIG. 10: Prism structures with variable angle

It also is not necessary that the prisms 50 have a constant main slope angle 51. In the exemplary embodiment of FIG. 10, the prisms are shown with a constant pitch and slope angle that varies with position along the prism structure, hence having a variable short side height 52.

It is possible that the prisms can have a variable size, slope angle and/or pitch together in order to optimize the performance of the system.

Figure 11:
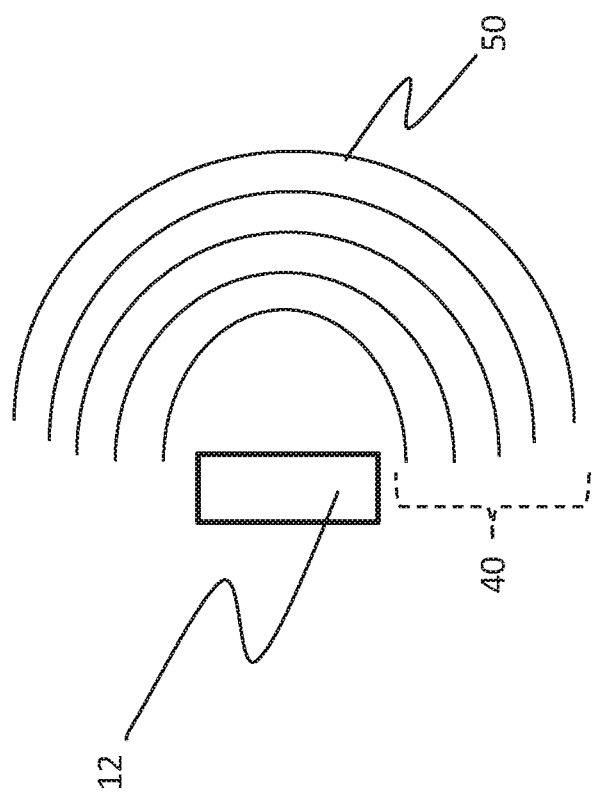
FIG. 11: Prism features with non-lenticular prism features

It is also not necessary that the prism structures 40 be lenticular. FIG. 11 shows an exemplary application whereby the prism structure is a plurality of curved prisms having curved prism lines that extend or are curved around a light source 12 so that the performance may be optimized for such particular application.

Figure 12:
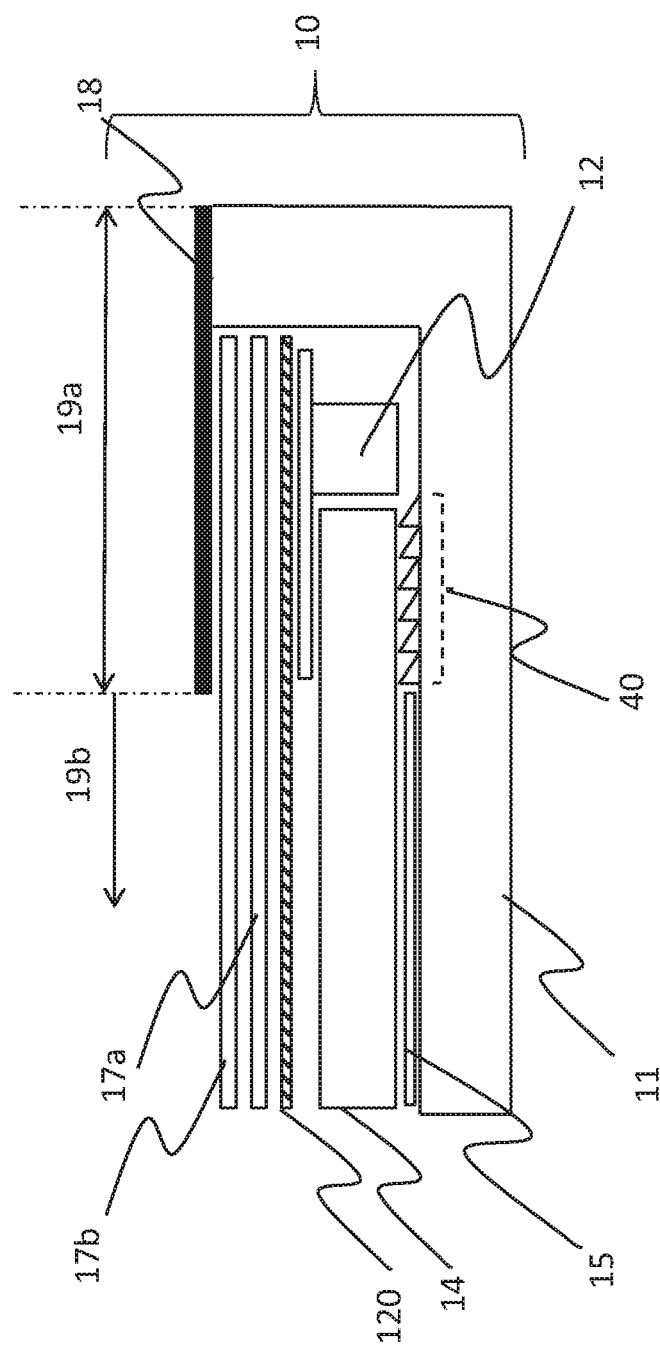
FIG. 12: An embodiment with a phosphor layer diffuser

In a further exemplary embodiment shown in FIG. 12, the diffuser 16 can be replaced by a phosphor layer 120 that also diffuses. The light source 12 can then be a colour light source, for example, blue or ultra violet that excites the phosphor in order to achieve the correct colour, for example, white. In this case the recycling at the light source is more efficient and does not involve any potential colour shifts in the recycled stray light.

Figure 13:
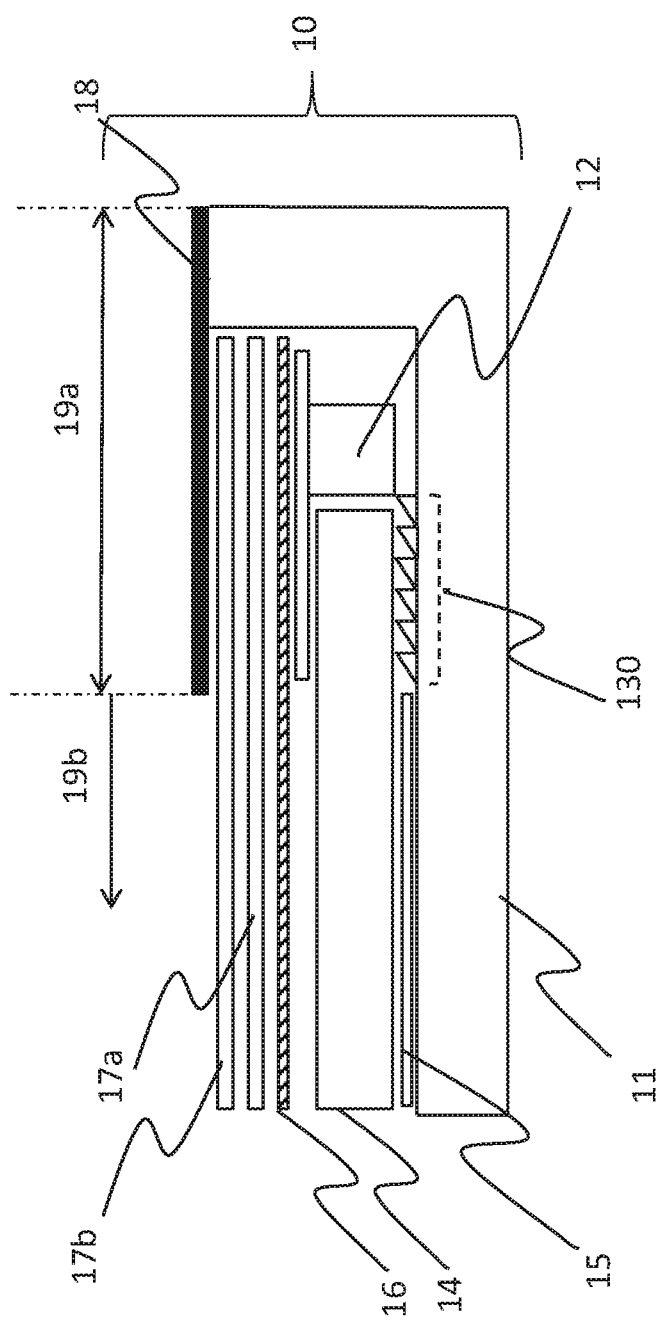
FIG. 13: Reverse prism features to increase the spread of stray light

In a further exemplary embodiment shown in FIG. 13, the prism structure 130 is reversed relative to the previous embodiments so that the sloping sides of the triangular prisms are facing away from the light source. In previous embodiments, the sloping sides of the prism elements 50 face towards the light source.

Figure 14:
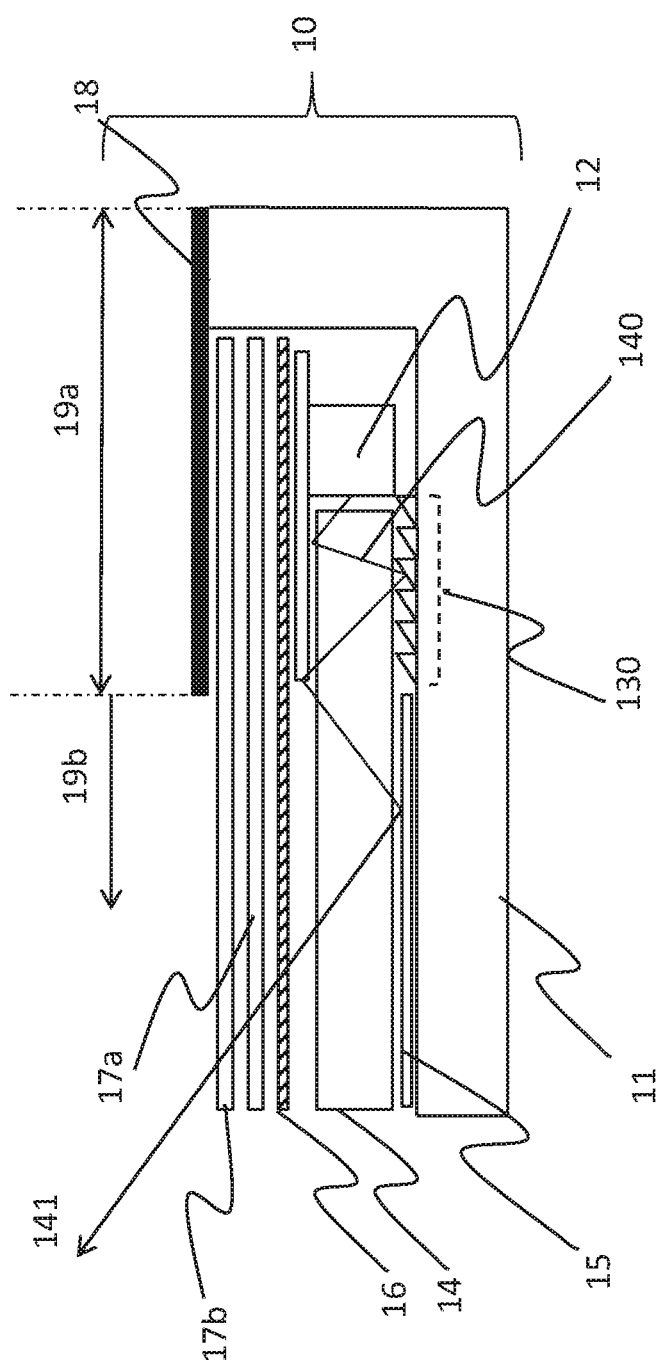
FIG. 14: The path of stray light in the reverse prism embodiment

The operation of the embodiment with reverse prism structures 130 is shown in FIG. 14. The stray light along light path 140 emitted by the light source 12 bounces and is incident on the prism features. In this case the light is turned towards the active area and becomes more horizontal. In this case the stray light 141 does exit the active area but at a much lower angle than that along path 31 shown in FIG. 3. In this case the stray light, being of a low energy is spread over a larger area of the active area, thus reduces the local brightness to significantly less than the extracted light, which does not greatly affect uniformity.

An aspect of the invention, therefore, is a backlight unit. In exemplary embodiments, the backlight unit may include a lightguide; a light source that emits light to the lightguide; a barrier layer positioned over the light source and part of the lightguide in a light emitting direction relative to the lightguide, the barrier layer defining a bezel area of the backlight unit, and an active area of the backlight unit from which light is emitted from the lightguide is an area adjacent to a boundary of the bezel area; and a prism structure positioned in the bezel area, separate from the lightguide, wherein stray light emitted from the light source uncoupled to the lightguide is at least partially coupled into the lightguide or directed along a direction of the lightguide by the prism structure. The backlight unit may include one or more of the following features, either individually or in combination.

In an exemplary embodiment of the backlight unit, the prism structure is configured as a plurality of lenticular triangular prisms.

In an exemplary embodiment of the backlight unit, the triangular prisms have a pitch that varies along the prism structure.

In an exemplary embodiment of the backlight unit, the triangular prisms have a main slope angle that varies with position along the prism structure.

In an exemplary embodiment of the backlight unit, the triangular prisms have a constant cross section.

In an exemplary embodiment of the backlight unit, slopes of the triangular prisms face toward the light source.

In an exemplary embodiment of the backlight unit, slopes of the triangular prisms face away from the light source.

In an exemplary embodiment of the backlight unit, the prism structure is located on a side of the light guide opposite from a light emitting side of the lightguide.

In an exemplary embodiment of the backlight unit, the backlight unit further includes a mounting frame for mounting components of the backlight unit, wherein the prism structure is mounted to the mounting frame.

In an exemplary embodiment of the backlight unit, the backlight unit further includes a back reflector positioned in the active area on a side of the light guide opposite from a light emitting side of the backlight, wherein a height of the prism structure relative to the mounting frame is no higher than the reflector.

In an exemplary embodiment of the backlight unit, the prism structure is located on a light emitting side of the lightguide.

In an exemplary embodiment of the backlight unit, the backlight unit further includes a flat panel connector on which the light source is mounted, and the prism structure in mounted on the flat panel connector adjacent to the light source.

In an exemplary embodiment of the backlight unit, the prism structure comprises a plurality of curved prisms having curved prism lines extending around the light source.

In an exemplary embodiment of the backlight unit, the backlight unit further includes linear in-coupling features located on an entrance face of the lightguide, wherein the in-coupling features spread light entering the lightguide from the light source.

In an exemplary embodiment of the backlight unit, the linear in-coupling features are trapezoidal prisms placed vertically on the entrance face of the light guide.

In an exemplary embodiment of the backlight unit, the light source is an edge light source.

In an exemplary embodiment of the backlight unit, the light source is an LED light source.

In an exemplary embodiment of the backlight unit, the barrier layer is an opaque or black tape.

In an exemplary embodiment of the backlight unit, the backlight unit further includes a diffuser layer for diffusing light emitted from the lightguide.

In an exemplary embodiment of the backlight unit, the diffuser layer is a phosphor layer.

INDUSTRIAL APPLICABILITY

This invention has particular application in smartphone, automotive and larger displays with frame structures behind the backlight. Applications also in small size and wearable displays to be used with displays that have very low bezel widths are also possible. Applications in tiled displays and general lighting systems are also possible.

The invention claimed is:
1. A backlight unit comprising:
a lightguide;
a light source that emits light to the lightguide;
a barrier layer positioned over the light source and part of the lightguide in a light emitting direction relative to the lightguide, the barrier layer defining a bezel area of the backlight unit, and an active area of the backlight unit from which light is emitted from the lightguide is an area adjacent to a boundary of the bezel area; and
a prism structure positioned in the bezel area, separate from the lightguide, wherein stray light emitted from the light source uncoupled to the lightguide is at least partially coupled into the lightguide or directed along a direction of the lightguide by the prism structure;
wherein the light source is positioned in close proximity to a light receiving surface of the light guide such that light from the light source goes directly into the lightguide without passing through the prism structure, and the light source is positioned in a common plane as the light guide in a direction of light emission from the light source.
2. The backlight unit of claim 1, wherein the prism structure is configured as a plurality of lenticular triangular prisms.
3. The backlight unit of claim 2, wherein the triangular prisms have a pitch that varies along the prism structure.
4. The backlight unit of claim 2, wherein the triangular prisms have a main slope angle that varies with position along the prism structure.
5. The backlight unit of claim 2, wherein the triangular prisms have a constant cross section.
6. The backlight unit of claim 2, wherein slopes of the triangular prisms face toward the light source.
7. The backlight unit of claim 2, wherein slopes of the triangular prisms face away from the light source.
8. The backlight unit of claim 1, wherein the prism structure is located on a side of the light guide opposite from a light emitting side of the lightguide.
9. The backlight unit of claim 8, further comprising a mounting frame for mounting components of the backlight unit, wherein the prism structure is mounted to the mounting frame.
10. The backlight unit of claim 9, further comprising a back reflector positioned in the active area on a side of the light guide opposite from a light emitting side of the backlight, wherein a height of the prism structure relative to the mounting frame is no higher than the reflector.
11. The backlight unit of claim 1, wherein the prism structure is located on a light emitting side of the lightguide.
12. The backlight unit of claim 11, further comprising a flat panel connector on which the light source is mounted, and the prism structure in mounted on the flat panel connector adjacent to the light source.
13. The backlight unit of claim 1, wherein the prism structure comprises a plurality of curved prisms having curved prism lines extending around the light source.
14. The backlight unit of claim 1, further comprising linear in-coupling features located on an entrance face of the lightguide, wherein the in-coupling features spread light entering the lightguide from the light source.
15. The backlight unit of claim 14, wherein the linear in-coupling features are trapezoidal prisms placed vertically on the entrance face of the light guide.
16. The backlight unit of claim 1, wherein the light source is an edge light source.
17. The backlight unit of claim 1, wherein the light source is an LED light source.
18. The backlight unit of claim 1, wherein the barrier layer is an opaque or black tape.
19. The backlight unit of claim 1, further comprising a diffuser layer for diffusing light emitted from the lightguide.
20. The backlight unit of claim 19, wherein the diffuser layer is a phosphor layer.

* * * * *